(12) United States Patent
Goodman et al.

(10) Patent No.: US 11,860,933 B2
(45) Date of Patent: Jan. 2, 2024

(54) PERSONALIZED AND CONTEXTUALIZED AUDIO BRIEFING

(71) Applicant: GOOGLE LLC, Mountain View, CA (US)

(72) Inventors: Michael Andrew Goodman, Oakland, CA (US); Bibo Xu, San Jose, CA (US)

(73) Assignee: Google LLC, Mountain View, CA (US)

( * ) Notice: Subject to any disclaimer, the term of this patent is extended or adjusted under 35 U.S.C. 154(b) by 380 days.

(21) Appl. No.: 16/558,907

(22) Filed: Sep. 3, 2019

(65) Prior Publication Data

US 2019/0391998 A1    Dec. 26, 2019

Related U.S. Application Data

(63) Continuation of application No. 15/593,236, filed on May 11, 2017, now Pat. No. 10,402,450.

(Continued)

(51) Int. Cl.
*G10L 15/22* (2006.01)
*G06F 16/635* (2019.01)
(Continued)

(52) U.S. Cl.
CPC ............ *G06F 16/635* (2019.01); *G06F 1/169* (2013.01); *G06F 1/181* (2013.01); *G06F 3/0362* (2013.01);
(Continued)

(58) Field of Classification Search
CPC ............... G10L 15/22; G10L 2015/221; G10L 2015/226; G10L 2015/227;
(Continued)

(56) References Cited

U.S. PATENT DOCUMENTS

| 5,659,665 A | 8/1997 | Whelpley, Jr. |
| 5,760,754 A | 6/1998 | Amero, Jr. et al. |

(Continued)

FOREIGN PATENT DOCUMENTS

| CN | 1909063 | 2/2007 |
| CN | 102064985 | 5/2011 |

(Continued)

OTHER PUBLICATIONS

ASCII Corporation, "Special Feature 1: World with Java2", ASCII Network Technology, vol. 4, No. 3, Mar. 1, 1999, pp. 1-31.

(Continued)

*Primary Examiner* — Richard Z Zhu
(74) *Attorney, Agent, or Firm* — Kilpatrick Townsend & Stockton LLP

(57) ABSTRACT

A method of providing a personalized audio briefing to a user is performed at an electronic device. The device receives identification of information sources associated with the user. Each of the information sources is associated with a content type. The device receives an authorization to access the identified information sources and a preferred order of content types for presentation within the audio briefing. It transmits to a remote system the identification, the authorization, and the preferred order. Following the transmitting, the device receives a verbal input from the user requesting the audio briefing. In response to the verbal input, the device receives a response generated by the remote system, including content from the information sources and information inserted by the remote system based on the authorization to access received from the user. The device outputs an audible response according to the preferred order.

20 Claims, 4 Drawing Sheets

Related U.S. Application Data

(60) Provisional application No. 62/336,565, filed on May 13, 2016, provisional application No. 62/336,566, filed on May 13, 2016, provisional application No. 62/336,569, filed on May 13, 2016, provisional application No. 62/336,551, filed on May 13, 2016.

(51) Int. Cl.

| | |
|---|---|
| *G06F 3/16* | (2006.01) |
| *G06F 16/332* | (2019.01) |
| *G06F 16/242* | (2019.01) |
| *G06F 16/00* | (2019.01) |
| *G06F 1/16* | (2006.01) |
| *G06F 1/18* | (2006.01) |
| *G06F 3/0354* | (2013.01) |
| *G06F 3/0362* | (2013.01) |
| *G06F 3/04883* | (2022.01) |
| *H04L 65/612* | (2022.01) |
| *H04L 65/613* | (2022.01) |
| *H04R 1/32* | (2006.01) |
| *G10L 13/02* | (2013.01) |
| *G10L 13/04* | (2013.01) |

(52) U.S. Cl.
CPC ...... *G06F 3/03547* (2013.01); *G06F 3/04883* (2013.01); *G06F 3/167* (2013.01); *G06F 16/00* (2019.01); *G06F 16/243* (2019.01); *G06F 16/3329* (2019.01); *G10L 15/22* (2013.01); *H04L 65/612* (2022.05); *H04L 65/613* (2022.05); *G10L 13/02* (2013.01); *G10L 13/04* (2013.01); *G10L 2015/223* (2013.01); *G10L 2015/226* (2013.01); *H04R 1/323* (2013.01); *H04R 2201/028* (2013.01); *H04R 2227/005* (2013.01)

(58) Field of Classification Search
CPC . G10L 2015/228; G10L 15/222; G10L 15/18; G10L 15/1815; G10L 15/1822; G10L 15/19; G10L 2015/223; G10L 2015/225; G06F 17/30761
USPC .............. 704/251, 270, 270.1, 275
See application file for complete search history.

(56) References Cited

U.S. PATENT DOCUMENTS

| | | | |
|---|---|---|---|
| 5,774,859 A | 6/1998 | Houser et al. | |
| 6,195,641 B1 | 2/2001 | Loring et al. | |
| 6,397,186 B1 | 5/2002 | Bush | |
| 6,681,380 B1 | 1/2004 | Britton et al. | |
| 7,260,538 B2 | 8/2007 | Calderone et al. | |
| 7,660,715 B1 | 2/2010 | Thambiratnam | |
| 7,698,131 B2 | 4/2010 | Bennett | |
| 7,721,313 B2 | 5/2010 | Barrett | |
| 8,150,699 B2 | 4/2012 | Patch | |
| 8,340,975 B1 | 12/2012 | Rosenberger | |
| 8,521,766 B1* | 8/2013 | Hoarty ............. | G10L 15/22 707/769 |
| 8,538,757 B2 | 9/2013 | Patch | |
| 9,190,049 B2* | 11/2015 | Kaszczuk ............ | G10L 13/08 |
| 9,304,736 B1 | 4/2016 | Whiteley et al. | |
| 9,324,322 B1 | 4/2016 | Torok et al. | |
| 9,338,493 B2 | 5/2016 | Van Os et al. | |
| 9,424,840 B1 | 8/2016 | Hart | |
| 9,443,527 B1 | 9/2016 | Watanabe et al. | |
| 9,554,632 B2 | 1/2017 | Tarnow et al. | |
| 9,721,570 B1 | 8/2017 | Beal | |
| 9,779,757 B1 | 10/2017 | Blanksteen et al. | |
| 9,786,294 B1 | 10/2017 | Bezos et al. | |
| 9,786,295 B2 | 10/2017 | Nakamura et al. | |
| 9,794,613 B2 | 10/2017 | Jang et al. | |
| 9,967,644 B2 | 5/2018 | Chawan et al. | |
| 9,990,002 B2 | 6/2018 | Kim | |
| 10,026,401 B1 | 7/2018 | Mutagi et al. | |
| 10,623,518 B2* | 4/2020 | Turkoglu ............ | H04L 67/535 |
| 10,832,684 B2* | 11/2020 | Sarikaya ............ | G10L 17/06 |
| 2003/0120744 A1 | 6/2003 | Kessler | |
| 2004/0001095 A1 | 1/2004 | Marques | |
| 2004/0128137 A1 | 7/2004 | Bush et al. | |
| 2005/0033582 A1 | 2/2005 | Gadd | |
| 2005/0144293 A1 | 6/2005 | Limont et al. | |
| 2005/0164681 A1* | 7/2005 | Jenkins ............ | H04M 1/72433 455/412.1 |
| 2005/0212684 A1 | 9/2005 | Huang | |
| 2006/0009154 A1 | 1/2006 | Tung | |
| 2006/0036642 A1* | 2/2006 | Horvitz ............ | H04L 67/51 707/999.102 |
| 2006/0075429 A1 | 4/2006 | Istvan et al. | |
| 2006/0276230 A1 | 12/2006 | McConnell | |
| 2007/0133603 A1* | 6/2007 | Weaver ............ | H04L 43/16 370/468 |
| 2007/0192486 A1 | 8/2007 | Wilson et al. | |
| 2007/0198267 A1 | 8/2007 | Jones | |
| 2008/0010652 A1 | 1/2008 | Booth | |
| 2008/0065388 A1 | 3/2008 | Cross | |
| 2008/0167860 A1 | 7/2008 | Goller | |
| 2008/0180572 A1 | 7/2008 | Pickett et al. | |
| 2008/0192495 A1 | 8/2008 | Kanemaru et al. | |
| 2008/0208569 A1 | 8/2008 | Simpson | |
| 2008/0228496 A1 | 9/2008 | Yu | |
| 2009/0100478 A1 | 4/2009 | Craner | |
| 2009/0178071 A1 | 7/2009 | Whitehead | |
| 2009/0319276 A1 | 12/2009 | Chang et al. | |
| 2010/0064218 A1 | 3/2010 | Bull | |
| 2010/0082342 A1* | 4/2010 | Erhart ............ | G10L 21/045 704/E15.001 |
| 2010/0185446 A1 | 7/2010 | Homma et al. | |
| 2010/0240307 A1 | 9/2010 | Sims | |
| 2010/0250239 A1 | 9/2010 | Itakura | |
| 2010/0265397 A1 | 10/2010 | Dasher et al. | |
| 2011/0161076 A1 | 6/2011 | Davis | |
| 2011/0161085 A1* | 6/2011 | Boda ............ | G06Q 30/02 704/260 |
| 2011/0283243 A1 | 11/2011 | Eckhardt et al. | |
| 2011/0311206 A1 | 12/2011 | Hubner | |
| 2012/0035924 A1 | 2/2012 | Jitkoff | |
| 2012/0096497 A1 | 4/2012 | Xiong et al. | |
| 2012/0143362 A1* | 6/2012 | Shih ............ | G06Q 30/02 700/94 |
| 2012/0198339 A1 | 8/2012 | Williams | |
| 2012/0226981 A1 | 9/2012 | Clavin | |
| 2012/0239661 A1 | 9/2012 | Giblin | |
| 2012/0253822 A1 | 10/2012 | Schalk | |
| 2012/0260192 A1 | 10/2012 | Detweiler | |
| 2012/0265528 A1 | 10/2012 | Gruber | |
| 2013/0046773 A1 | 2/2013 | Kannan | |
| 2013/0080177 A1 | 3/2013 | Chen | |
| 2013/0132094 A1 | 5/2013 | Lim | |
| 2013/0138424 A1 | 5/2013 | Koenig | |
| 2013/0290110 A1 | 10/2013 | LuVogt | |
| 2013/0322634 A1 | 12/2013 | Bennett | |
| 2013/0332159 A1 | 12/2013 | Federighi et al. | |
| 2013/0332311 A1* | 12/2013 | Pu ............ | G06F 16/958 705/26.8 |
| 2013/0339850 A1 | 12/2013 | Hardi | |
| 2014/0006483 A1 | 1/2014 | Garmark et al. | |
| 2014/0074483 A1 | 3/2014 | Van Os | |
| 2014/0108019 A1 | 4/2014 | Ehsani | |
| 2014/0125271 A1 | 5/2014 | Wang | |
| 2014/0163978 A1 | 6/2014 | Basye et al. | |
| 2014/0244266 A1* | 8/2014 | Brown ............ | G10L 15/22 704/275 |
| 2014/0244568 A1 | 8/2014 | Goel | |
| 2014/0257788 A1 | 9/2014 | Xiong et al. | |
| 2014/0278435 A1 | 9/2014 | Ganong, III | |
| 2014/0297268 A1 | 10/2014 | Govrin | |
| 2014/0317502 A1 | 10/2014 | Brown et al. | |
| 2014/0333449 A1 | 11/2014 | Thiesfeld et al. | |

(56) References Cited

U.S. PATENT DOCUMENTS

| | | | |
|---|---|---|---|
| 2014/0365226 A1 | 12/2014 | Sinha | |
| 2014/0365887 A1 | 12/2014 | Cameron | |
| 2015/0006182 A1 | 1/2015 | Schmidt | |
| 2015/0066510 A1 | 3/2015 | Bohrer et al. | |
| 2015/0081296 A1 | 3/2015 | Lee et al. | |
| 2015/0097666 A1 | 4/2015 | Boyd | |
| 2015/0106096 A1 | 4/2015 | Toopran et al. | |
| 2015/0112985 A1 | 4/2015 | Roggero et al. | |
| 2015/0154976 A1 | 6/2015 | Mutagi | |
| 2015/0162006 A1 | 6/2015 | Kummer | |
| 2015/0169284 A1 | 6/2015 | Quast et al. | |
| 2015/0199566 A1 | 7/2015 | Moore et al. | |
| 2015/0212664 A1 | 7/2015 | Freer | |
| 2015/0261496 A1 | 9/2015 | Faaborg et al. | |
| 2015/0331666 A1 | 11/2015 | Bucsa et al. | |
| 2015/0365787 A1* | 12/2015 | Farrell | H04W 4/08 455/456.1 |
| 2016/0042735 A1* | 2/2016 | Vibbert | G10L 15/222 704/257 |
| 2016/0179462 A1 | 6/2016 | Bjorkengren | |
| 2016/0321263 A1* | 11/2016 | Madiraju | G06Q 10/109 |
| 2016/0323343 A1 | 11/2016 | Sanghavi et al. | |
| 2017/0010587 A1 | 1/2017 | Champy et al. | |
| 2017/0068423 A1 | 3/2017 | Napolitano et al. | |
| 2017/0090858 A1* | 3/2017 | Paris | G06F 16/638 |
| 2017/0154628 A1 | 6/2017 | Mohajer et al. | |
| 2017/0180499 A1 | 6/2017 | Gelfenbeyn et al. | |
| 2017/0221322 A1 | 8/2017 | Ignomirello | |
| 2017/0236512 A1 | 8/2017 | Williams et al. | |
| 2017/0262537 A1 | 9/2017 | Harrison et al. | |
| 2017/0263147 A1* | 9/2017 | King | G11B 27/026 |
| 2017/0270927 A1 | 9/2017 | Brown et al. | |
| 2017/0300831 A1 | 10/2017 | Gelfenbeyn et al. | |
| 2017/0329766 A1 | 11/2017 | Matsuyama | |
| 2017/0339444 A1 | 11/2017 | Shaw et al. | |
| 2017/0347477 A1 | 11/2017 | Avital | |
| 2018/0004482 A1 | 1/2018 | Johnston et al. | |
| 2018/0041408 A1 | 2/2018 | Dagum et al. | |
| 2020/0033144 A1* | 1/2020 | Du | G01C 21/3484 |

FOREIGN PATENT DOCUMENTS

| | | |
|---|---|---|
| CN | 102148031 | 8/2011 |
| CN | 102196207 | 9/2011 |
| CN | 103474068 | 12/2013 |
| CN | 103501382 | 1/2014 |
| CN | 104135697 | 11/2014 |
| CN | 104506944 | 4/2015 |
| CN | 104685561 | 6/2015 |
| CN | 105209859 | 12/2015 |
| CN | 105247845 | 1/2016 |
| CN | 103095325 | 3/2016 |
| CN | 102289374 | 6/2017 |
| JP | 2004102415 | 4/2004 |
| JP | 2004171257 | 6/2004 |
| JP | 2006286275 | 10/2006 |
| JP | 2009521745 | 6/2009 |
| JP | 2014003610 | 1/2014 |
| JP | 2014065359 | 4/2014 |
| JP | 2015079237 | 4/2015 |
| KR | 20120137425 | 12/2012 |
| KR | 20150029974 | 3/2015 |
| KR | 101579292 | 12/2015 |
| WO | WO 2012/103321 A2 | 8/2012 |
| WO | WO 2014/001914 A2 | 1/2014 |
| WO | WO 2014/064531 A1 | 5/2014 |
| WO | WO 2016054230 | 4/2016 |

OTHER PUBLICATIONS

Associated Press, "Will the Internet Listen to Your Private Conversations", last updated Jul. 29, 2015, pp. 1-4, available at: https://nypost.com/2015/07/29/will-the-internet-listen-to-your-private-conversations/.

Carroll, R., "Goodbye Privacy, Hello 'Alexa': Amazon Echo, the Home Robot Who Hears it All", last updated Nov. 21, 2015, pp. 1-8, available at: https://www.theguardian.com/technology/2015/nov/21/amazon-echo-alexa-home-robot-privacy-cloud.

Examination Report dated Feb. 14, 2020 in EP Patent Application No. 17725416.6.

Examination Report dated May 27, 2020 in EP Patent Application No. 17725446.3.

Examination Report dated Jun. 10, 2020 in EP Patent Application No. 17726055.1.

Examination Report dated Nov. 20, 2020 in EP Patent Application No. 17727769.6.

Extended European Search Report dated Sep. 23, 2020 in EP Patent Application No. 20191991.7.

Fitzpatrick, A., "Your Gadgets May Soon Be Spying on Your Conversations", last updated Nov. 11, 2014, pp. 1-4, available at: https://time.com/3576816/amazon-echo-microsoft-kinect/.

Fitzpatrick, J., "How to Stop Your Amazon Echo from Listening In", last updated Jun. 20, 2017, pp. 1-4, available at: https://www.howtogeek.com/237397/how-to-stop-your-amazon-echo-from-listening-in/.

Heyes, J.D., "Amazon Lies to Customers, Says Echo Device Doesn't Eavesdrop . . . But is Always Listening for the Right Word", last updated Aug. 13, 2015, pp. 1-12, available at: https://www.naturalnews.com/050771_Amazon_Echo_privacy_audio_surveillance.html.

International Search Report and Written Opinion dated Jul. 21, 2017 in International Patent Application No. PCT/US2017/032511.

International Search Report and Written Opinion dated Aug. 25, 2017 in International Patent Application No. PCT/US2017/032002.

Lida et al., "Enhanced Touch", in Proceedings of the 8th International Conference on Advance in Computer Entertainment Technology, New York, Jan. 2011, pp. 1-2.

Newitz, A., "Why Is My Digital Assistant So Creepy?", last updated Jan. 28, 2015, pp. 1-6, available at: https://gizmodo.com/why-is-my-digital-assistant-so-creepy-1682216423.

Nikkei Linux, "Revive Old PC with Linux! Revised Part 9, Revival as a PC Running on a Virtual Machine", Nikkei Business Publications, Inc., vol. 15, No. 11, Oct. 8, 2013, pp. 151-156, pp. 1-13.

Notice of Allowance dated Jan. 15, 2019 in U.S. Appl. No. 15/592,126.

Notice of Allowance dated Feb. 5, 2020 in U.S. Appl. No. 16/020,971.

Notice of Allowance dated Feb. 7, 2019 in U.S. Appl. No. 15/592,120.

Notice of Allowance dated Feb. 19, 2020 in KR Patent Application No. 2018-7036139.

Notice of Allowance dated May 1, 2019 in U.S. Appl. No. 15/593,236.

Notice of Allowance dated Jun. 25, 2021 in KR Patent Application No. 10-2018-7033471.

Notice of Allowance dated Aug. 12, 2021 in U.S. Appl. No. 16/241,338.

Notice of Allowance dated Aug. 30, 2019 in U.S. Appl. No. 15/592,137.

Notice of Allowance dated Sep. 1, 2020 in U.S. Appl. No. 16/421,143.

Notice of Allowance dated Nov. 21, 2018 in U.S. Appl. No. 15/592,128.

Office Action dated Jan. 7, 2020 in JP Patent Application No. 2018-559837.

Office Action dated Jan. 19, 2021 in JP Patent Application No. 2018-559707.

Office Action dated Feb. 3, 2021 in U.S. Appl. No. 16/421,338.

Office Action dated Mar. 7, 2018 in U.S. Appl. No. 15/592,126.

Office Action dated Mar. 7, 2018 in U.S. Appl. No. 15/593,236.

Office Action dated Mar. 9, 2018 in U.S. Appl. No. 15/592,128.

Office Action dated Mar. 24, 2020 in U.S. Appl. No. 16/421,143.

Office Action dated Apr. 20, 2018 in U.S. Appl. No. 15/592,126.

Office Action dated Apr. 20, 2021 in U.S. Appl. No. 16/421,338.

Office Action dated Apr. 21, 2020 in KR Patent Applicaiton No. 2018-7033471.

Office Action dated Apr. 26, 2018 in U.S. Appl. No. 15/592,137.

Office Action dated Apr. 27, 2020 in KR Patent Application No. 2016-7033465.

(56) References Cited

OTHER PUBLICATIONS

Office Action dated May 8, 2018 in U.S. Appl. No. 15/592,128.
Office Action dated May 11, 2020 in U.S. Appl. No. 16/421,143.
Office Action dated May 17, 2018 in U.S. Appl. No. 15/592,120.
Office Action dated May 17, 2018 in U.S. Appl. No. 15/593,236.
Office Action dated May 22, 2019 in U.S. Appl. No. 15/592,137.
Office Action dated Jun. 1, 2021 in CN Patent Application No. 201780011386.8.
Office Action dated Dec. 30, 2020 in U.S. Appl. No. 16/421,338.
Office Action dated Jun. 3, 2021 in CN Patent Application No. 201780011357.1.
Office Action dated Jun. 6, 2018 in U.S. Appl. No. 15/592,137.
Office Action dated Jun. 9, 2021 in CN Patent Application No. 201780009238.2.
Office Action dated Jun. 18, 2018 in U.S. Appl. No. 15/592,126.
Office Action dated Jul. 7, 2020 in JP Patent Application No. 2018-558937.
Office Action dated Jul. 18, 2018 in U.S. Appl. No. 15/592,120.
Office Action dated Jul. 25, 2019 in U.S. Appl. No. 16/020,971.
Office Action dated Jul. 29, 2020 in U.S. Appl. No. 16/421,143.
Office Action dated Aug. 16, 2019 in U.S. Appl. No. 16/020,971.
Office Action dated Aug. 29, 2018 in U.S. Appl. No. 15/593,236.
Office Action dated Sep. 20, 2018 in U.S. Appl. No. 15/592,137.
Office Action dated Sep. 21, 2020 in CN Patent Application No. 201780009235.9.
Office Action dated Oct. 10, 2020 in CN Patent Application No. 201780011357.1.
Office Action dated Oct. 27, 2020 in CN Patent Application No. 201780009238.2.
Office Action dated Nov. 4, 2019 in U.S. Appl. No. 16/020,971.
Office Action dated Nov. 16, 2020 in KR Patent Application No. 10-2020-7029660.
Souma et al., "Development of Koala Robot Capable of Expressing Various Kinds of Feelings", in proceedings of 12th International Conference on Control, Oct. 2012, pp. 424-429.
Woods, B., "Forget Amazon Echo, "the Creepy Factor" Has Put Me Off Voice Control Completely", last updated Jun. 27, 2015, pp. 1-4, available at:https://thenextweb.com/news/forget-amazon-echo-the-creepy-factor-has-put-me-off-voice-control-completely#gref.
Summons to Attend Oral Proceedings dated Feb. 15, 2022 in EP Patent Application No. 17727769.6.
Arima, I., et al., "A PC-based Automatic Speech Recognition System, Reports of the Autumn Meeting 1996", In Acoustical Society of Japan, vol. 1, Sep. 25, 1996, pp. 183-184.
Examination Report dated Sep. 6, 2021 in EP Patent Applicaiton No. 17725446.3.
Examination Report dated Sep. 24, 2021 in EP Patent Application No. 17725416.6.
Fujitsu Limited, "FM Towns LiveMotion, Support Library, V2.1, Explanation of Additional Functions", Technical Report 81SP-1090-2-0, Feb. 1995, pp. 3-21.
Moriwaki, D., "Internet Communication Starting with WinSock", In Delphi Magazine, vol. 7, 1st Ed., PS Network, Nov. 1, 1999, pp. 104-130.
Notice of Allowance dated Jan. 26, 2022 in U.S. Appl. No. 16/888,346.
Office Action dated Sep. 23, 2021 in U.S. Appl. No. 16/888,346.
Office Action dated Nov. 1, 2021 in CN Patent Application No. 201780011357.1.
Office Action dated Nov. 30, 2021 in JP Patent Application No. 2018-559707.
Office Action dated Dec. 14, 2021 in JP Patent Application No. 2020-191833.
Tested, "Amazon Echo Review", last updated Sep. 1, 2015, one page, available at: https://v.qq.com/x/page/j00176f6mmo.html,%20tencent.
Wang, E., "Disassembly of the Amazon Echo-the World's Most Intelligent Smart Speaker", EEWorld, last updated Dec. 18, 2014, pp. 1-20, available at: http://bbs.eeworld.com.cn/thread-453017-1-1.html.
Google LLC, International Preliminary Report on Patentability, PCT/US2017/032002, dated Nov. 13, 2018, 7 pgs.
Google, International Search Report/Written Opinion, PCT/US2017/032002, dated Aug. 25, 2017, 9 pgs.
Google LLC, International Preliminary Report on Patentability, PCT/US2017/032511, dated Nov. 13, 2018, 6 pgs.
Google Inc., International Search Report/Written Opinion, PCT/US2017/032511, dated Jul. 21, 2017, 8 pgs.
Google LLC, International Preliminary Report on Patentability, PCT/US2017/032262, dated Nov. 13, 2018, 8 pgs.
Google Inc., International Search Report/Written Opinion, PCT/US2017/032262, dated Aug. 24, 2017, 10 pgs.
Google LLC, International Preliminary Report on Patentability, PCT/US2017/032260, dated Nov. 13, 2018.
Google Inc., International Search Report/Written Opinion, PCT/US2017/032260, dated Aug. 23, 2017.
Google LLC, International Preliminary Report on Patentability, PCT/US2017/032263, dated Nov. 13, 2018.
Google Inc., International Search Report/Written Opinion, PCT/US2017/032263, dated Aug. 23, 2017, 10 pgs.

* cited by examiner

PERSONALIZED AND CONTEXTUALIZED AUDIO BRIEFING

RELATED APPLICATIONS

This application is a continuation of and claims priority to U.S. patent application Ser. No. 15/593,236, filed May 11, 2017, titled "Personalized and Contextualized Audio Briefing," which is incorporated by reference herein in its entirety.

U.S. application Ser. No. 15/593,236 claims the benefit of the following provisional applications, which are incorporated by reference herein in their entirety:

U.S. Provisional Application No. 62/336,551, titled "Personalized and Contextualized Audio Briefing," filed May 13, 2016;

U.S. Provisional Application No. 62/336,566, titled "LED Design Language for Visual Affordance of Voice User Interfaces," filed May 13, 2016;

U.S. Provisional Application No. 62/336,569, titled "Voice-Controlled Closed Caption Display," filed May 13, 2016; and U.S. Provisional Application No. 62/336,565, titled "Media Transfer Among Media Output Devices," filed May 13, 2016.

This application is related to the following applications, which are incorporated by reference herein in their entirety:

U.S. patent application Ser. No. 15/592,120, titled "LED Design Language for Visual Affordance of Voice User Interfaces," filed May 10, 2017, now U.S. Pat. No. 10,304,450, issued on May 28, 2019;

U.S. patent application Ser. No. 15/592,126, titled "Voice-Controlled Closed Caption Display," filed May 10, 2017, now U.S. Pat. No. 10,235,997, issued on Mar. 19, 2019;

U.S. patent application Ser. No. 15/592,128, titled "Media Transfer among Media Output Devices," filed May 10, 2017, now U.S. Pat. No. 10,332,516, issued on Jun. 25, 2019; and U.S. patent application Ser. No. 15/592,137, titled "Implementations for Voice Assistant on Devices," filed May 10, 2017.

TECHNICAL FIELD

This application relates generally to computer technology, including but not limited to personalized and contextualized audio briefings.

BACKGROUND

Voice-based assistants that interact with a user through audio/voice input and output have grown in popularity alongside the growth of the Internet and cloud computing. These assistants can provide an interface for the consumption of digital media, as well as provide various types of information, including news, sports scores, weather, and stocks, to name a few examples.

The information may be presented in the form of an audio briefing, where the information is spoken out loud to the user. However, the audio briefing may be canned, with limited customization options. For example, a user may select particular news sources for a news audio briefing, and the resulting audio briefing includes reading news articles from those sources, some of which may be extraneous and uninteresting to the user. An audio briefing that includes much extraneous and uninteresting information depresses the user's interest in listening through the audio briefing.

SUMMARY

The implementations described in this specification are directed to providing information that is custom tailored to a user, highly relevant at the moment in which information is asked for by the user, and aggregated from a variety of sources for the user.

In accordance with some implementations, a personalized and contextualized audio briefing provides useful, timely information in audio format to a user. The audio briefing can provide, for example, information regarding weather in the user's area, traffic to the user's office, events on the user's calendar, reminders about things the user need to do, recent activity from the user's favorite sports teams, flight status for a flight the user has that day, news on topics the user is interested in, etc. The audio briefing is tailored to the user. The audio briefing aggregates this information and presents what is relevant at the moment in which the user asks for the briefing.

In some implementations, the audio briefing includes information based on what is known about the user (with permission from the user) to surface relevant information that the user has not specifically asked for. For example, if a user often listens to music by a particular artist, the briefing may automatically inform the user when the artist will be in the user's locale.

In some implementations, the audio briefing functions as a platform for advertisements and promotions. In the example above, the briefing can ask the user if he or she would like to purchase tickets to see the artist in concert and allow him or her do so through a sponsored integration in the moment.

In accordance with some implementations, a method includes, at an electronic device with one or more processors, memory, an audio input device, and an audio output device: receiving through the audio input device a verbal input from a user; transmitting information corresponding to the verbal input to a remote system; receiving from the remote system a response responsive to the verbal input, the response including information in accordance with one or more criteria; and outputting the response through the audio output device.

In accordance with some implementations, an electronic device includes an audio input device, an audio output device, one or more processors, and memory storing one or more programs to be executed by the one or more processors. The one or more programs include instructions for: receiving through the audio input device a verbal input from a user; transmitting information corresponding to the verbal input to a remote system; receiving from the remote system a response responsive to the verbal input, the response including information in accordance with one or more criteria; and outputting the response through the audio output device.

In accordance with some implementations, a non-transitory computer readable storage medium stores one or more programs. The one or more programs include instructions, which, when executed by an electronic device with an audio input device, an audio output device, and one or more processors, cause the electronic device to: receive through the audio input device a verbal input from a user; transmit information corresponding to the verbal input to a remote system; receive from the remote system a response responsive to the verbal input, the response including information in accordance with one or more criteria; and output the response through the audio output device.

BRIEF DESCRIPTION OF THE DRAWINGS

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
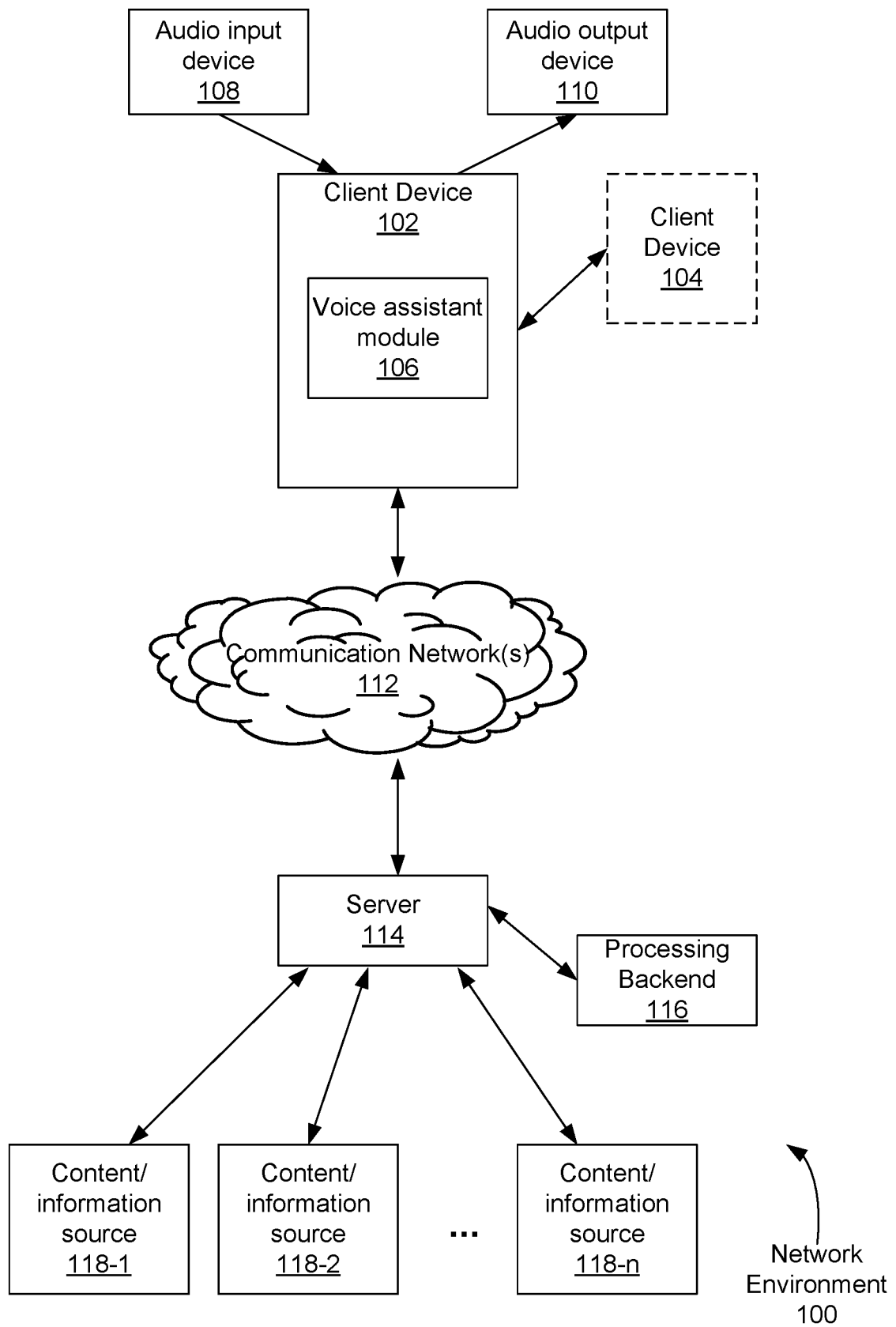
FIG. 1 is an example network environment in accordance with some implementations.

FIG. 1 illustrates a network environment 100 in accordance with some implementations. The network environment 100 includes a client device 102. The client device 102 is coupled to an audio input device 108 (e.g., a microphone) and an audio output device 110 (e.g., one or more speakers). In some implementations, both the audio input device 108 and the audio output device 110 are components of the client device 102 (e.g., voice command device, wireless speaker with microphone, smartphone, tablet device, laptop computer, wearable device). In some implementations, the audio input device 108 is a component of the client device 102, and the audio output device 110 is a separate device to which the client device 102 is coupled, or vice versa. In some implementations, the audio input device 108 and the audio output device 110 are separate devices to which the client device 102 (e.g., a casting device) is coupled. In some implementations, the client device 102 is a mobile phone, a tablet computer, a laptop computer, a desktop computer, a wireless speaker, a voice command device or voice assistant device, a television, a soundbar, a casting device, an in-car system, and a wearable personal device.

In some implementations, the client device 102 is communicatively coupled to another client device 104 (e.g., a smartphone, a tablet device, a laptop computer, a desktop computer). The client device 104 includes an application (e.g., a settings or configuration app) (not shown) that may be used by a user to configure the client device 102 and features and functionality on the client device 102. It should be appreciated that not all client devices 102 require a second client device (e.g., client device 104) for configuration purposes.

In some implementations, the client device 102 and/or 104 respectively includes or is coupled to a display device (not shown).

In some implementations, the client device 102 and/or 104 respectively includes one or more visual indicators (e.g., LED lights) (not shown). Information regarding a status or state of the client device and/or a voice assistant functionality, including an audio briefing feature of the voice assistant functionality, may be displayed on the display device (e.g., in textual and graphical formats) and/or the visual indicators (e.g., as light patterns on LED lights). For example, light patterns displayed on the LED lights may indicate a status of the audio briefing. An example of operation of LED lights to indicate status or state information for voice assistant functionality is described in U.S. patent application Ser. No. 15/592,120, titled "LED Design Language for Visual Affordance of Voice User Interfaces," filed May 10, 2017, which is incorporated by reference herein in its entirety.

The client device 102, and optionally the client device 104, is communicatively coupled to a server system 114 through one or more communicative networks 112 (e.g., local area networks, wide area networks, the Internet).

The client device 102 includes a voice assistant module 106. The voice assistant module 106 performs voice assistant operations (e.g., detecting hotwords in a verbal input received by the audio input device 108, processing the verbal input, communicating the verbal input or information corresponding to the verbal input to a server system 114, receiving and processing a response from the server system 114 to the verbal input, etc.). In some implementations, the voice assistant module 106 is, includes, or links to a device-agnostic library that may be installed on, and implements voice assistant functionality that is consistent across, a variety of devices. In some implementations, depending on the type of the client device 102, the voice assistant module 106 is included in an application installed in the device, included in the device operating system, or embedded in the device (e.g., embedded in the firmware). An example of a voice assistant library is described in U.S. patent application Ser. No. 15/592,137, titled "Implementations for Voice Assistant on Devices," filed May 10, 2017, which is incorporated by reference herein in its entirety.

In some implementations, the voice assistant module 106 detects hotwords in a first verbal input received by the audio input device 108, which "wakes up" the voice assistant and prepares the voice assistant module 106 to receive a second verbal input that may include a request or command. After the second verbal input is received, the voice assistant module 106 optionally processes the verbal input to determine information corresponding to the verbal input, and transmits the verbal input and/or the information corresponding to the verbal input to the server 114. The server 114 receives the verbal input or information corresponding to the verbal input, and processes the received verbal input or corresponding information (e.g., at the processing backend 116, which may be a part of the server system 114) to determine an appropriate response. The appropriate response may include content, information, or instructions or metadata to the client device 102 to perform a function or operation. The server 114 obtains the content/information for the response from one or more content/information sources 118. The server 114 transmits the response to the client device 102, which outputs the content or information through the audio output device 110 and/or performs the function or operation. In some implementations, the response includes the content and information in spoken audio format, and the voice assistant module 106 plays the spoken audio. In some other implementations, the response includes the content and information in textual format, and the voice assistant module 106 performs text-to-speech conversion on the textual content and information to voice the content and information out loud.

In some implementations, functionality and settings of the voice assistant module 106 are configurable at the client device 102 directly or through the client device 104. The configuration may include, for example, association with one or more user accounts (e.g., at an email service, at an online calendar, at an online music service, etc.) and authorization to access information in those accounts, specifying content or information sources, specifying categories of content or information, and so on.

The user can request the voice assistant to provide an audio briefing (also referred to herein as a "daily brief") that is output (e.g., spoken out loud) though the audio output device 110. In some implementations, following speaking the hotword to wake up the voice assistant, the user speaks a verbal input that includes one or more predefined keywords associated with a request for an audio briefing. The audio briefing includes various content and information. In some implementations, the contents and information of the audio briefing is personalized to the user; the user can pre-specify categories and sources of content/information to be included in the briefing (e.g., when configuring the voice assistant module 106).

In some implementations, the content and information may also be selected or filtered for inclusion in or omission from the response based on one or more criteria. These criteria include, for example, the time of day, a type of the device, a location of the device, and a usage history of the device by the user. For example, if the time of day is midday around 12 PM and the user had specified commute traffic information as one of the specified categories of information for the audio briefing, the commute traffic information may nevertheless be omitted from the response because the time of day provides the context that commute traffic information is not as useful or interesting to the user at the time. Thus, inclusion or omission based these criteria can supplement or override the pre-specification of sources and categories by the user.

In some implementations, the order in which the content and information within the audio briefing are voiced (e.g., weather then commute traffic then appointments then news) are also pre-specified by the user. In some implementations, that order may be modified based on the one or more criteria. For example, if the user has an urgent appointment (e.g., less than an hour away), then the order in which the content/information within the audio briefing are voiced out may be re-arranged so that the appointments are voiced out earlier within the audio briefing.

In some implementations, the audio briefing may include content/information inserted based on a history of the user (as known to the server 114 based on authorizations to access given by the user). For example, if the user's history indicates that the user frequently commands the client device 102 to play songs from a particular artist, the server 114 can identify upcoming appearance dates and locations by that artist, and include in the audio briefing appearances in proximity to the location of the client device 102 (e.g., within the user's metropolitan area, within some distance threshold from the location of the client device 102) in the audio briefing.

Further, in some implementations, promotions and advertisements related to the content/information in the audio briefing may be included in the audio briefing. For example, continuing with the example above regarding appearances by the artist, the server 114 may include in the audio briefing a promotion or advertisement to purchase tickets for the artist's appearances.

Thus, the content/information in the audio briefing may be contextualized based on one or more criteria. The contextualization includes, for example, omitting content/information that would otherwise have been included in the audio briefing, and/or re-ordering the content/information within the audio briefing.

In some implementations, the audio briefing includes default categories of content/information. For example, the audio briefing may, by default, include the current time and a salutation. In some implementations, even default content/information may be contextualized. For example, the salutation (e.g., "good morning," "good evening," etc.) may differ based on the time of day.

In some implementations, the audio briefing may include an "audio doodle." The audio doodle may be, for example, a quote or a "fun" fact voiced out loud as part of the audio briefing. The audio briefing may change, for example, per day or per briefing. The user may opt-in or opt-out of having the audio doodle included in the audio briefing (i.e., the audio doodle is another category of content/information the user can pre-specify for inclusion/omission). In some implementations, the audio doodle is the same across multiple users (i.e., users that opt-in to the audio doodle get the same audio doodles in their respective audio briefings).

In some implementations, the content/information that can be included in the audio briefing includes, but is not limited to one or more of: the current time, a salutation, an audio doodle, upcoming birthdays, flight status, messages (emails, text messages, instant messages), weather, commute traffic, calendar events, reminders, tasks, finance information (e.g., stocks), sports information (e.g., scores, schedules), horoscopes, news, music, and information on voice assistant features (e.g., news of new or upcoming features, tips on how to user the voice assistant).

In some implementations, the content/information sources 118 include one or more of: websites, databases, user accounts and associated information (e.g., email, calendar, usage history, etc.), online music services, etc.

In some implementations, the audio briefing may be initiated by an action. For example, if the client device 102 is a wearable device, the client device 102 may detect when the device is put on by the user, and in response to detecting that it is put on by the user, initiate the audio briefing.

Figure 2:
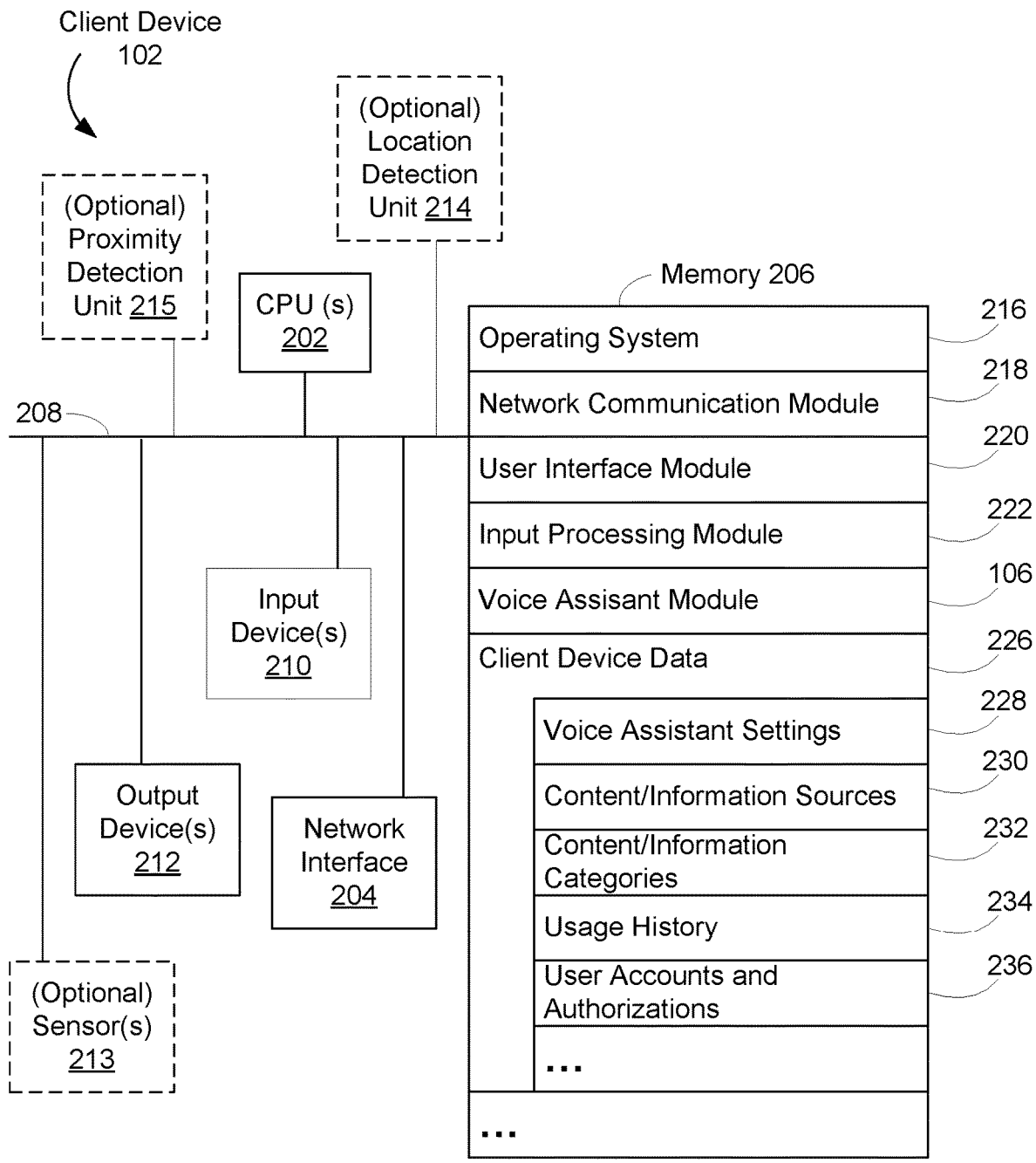
FIG. 2 is an example client device in accordance with some implementations.

FIG. 2 is a block diagram illustrating an example client device 102 of a network environment 100 in accordance with some implementations. Examples of the client device include, but are not limited to, a mobile phone, a tablet computer, a laptop computer, a desktop computer, a wireless speaker, a voice command device, a television, a soundbar, a casting device, an in-car system, and a wearable personal device. The client device 102, typically, includes one or more processing units (CPUs) 202, one or more network interfaces 204, memory 206, and one or more communication buses 208 for interconnecting these components (sometimes called a chipset). The client device 102 includes one or more input devices 210 that facilitate user input, including an audio input device 108 (e.g., a voice-command input unit or microphone), and optionally other input devices such as a keyboard, a mouse, a touch screen display, a touch-sensitive input pad, a gesture capturing camera, or other input buttons or controls. Furthermore, some the client devices 102 use a microphone and voice recognition or a camera and gesture recognition to supplement or replace the keyboard. The client device 102 also includes one or more output devices 212, including an audio output device 110 (e.g., one or more speakers, headphones or the like), and optionally one or more visual displays and/or one or more visual indicator (e.g., LEDs), that enable presentation of user interfaces and display content. Optionally, the client device 102 includes a location detection device 214, such as a GPS (global positioning satellite) or other geo-location receiver, for determining the location of the client device 102. The client device 102 may optionally also include a proximity detection device 215, e.g., an IR sensor, for determining a proximity of the client device 102 to other objects (e.g., the user-wearer in the case of a wearable personal device). Optionally, the client device 102 includes sensor(s) 213 (e.g., an accelerometer, gyroscope, etc.).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- Operating system 216 including procedures for handling various basic system services and for performing hardware dependent tasks;
- Network communication module 218 for connecting the client device 102 to other devices (e.g., the server system 114, client device 104, other client devices 102) via one or more network interfaces 204 (wired or wireless) and one or more networks 112, such as the Internet, other wide area networks, local area networks, metropolitan area networks, and so on;
- User interface module 220 for enabling presentation of information at the client device 102 via one or more output devices 212 (e.g., displays, speakers, etc.);
- Input processing module 222 for detecting one or more user inputs or interactions from one of the one or more input devices 210 and interpreting the detected input or interaction;
- Voice assistant module 106 for processing verbal inputs, receiving responses, including audio briefings, from the server 114, and outputting the responses; and
- client data 226 storing at least data associated with the voice assistant module 106, including:
  - Voice assistant settings 228 for storing information associated with settings and configurations for the voice assistant functionality;
  - Content/information sources 230 and categories 232 for storing user-specified sources and categories of content/information to be included in audio briefings;
  - Usage history 234 for storing information associated with the usage of the voice assistant, such as commands and requests received, operations performed in response to commands and requests, and so on; and
  - User Accounts and authorizations 236 for storing the user's authorizations to access the user's accounts at content/information sources 230 and account information for those authorized accounts.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
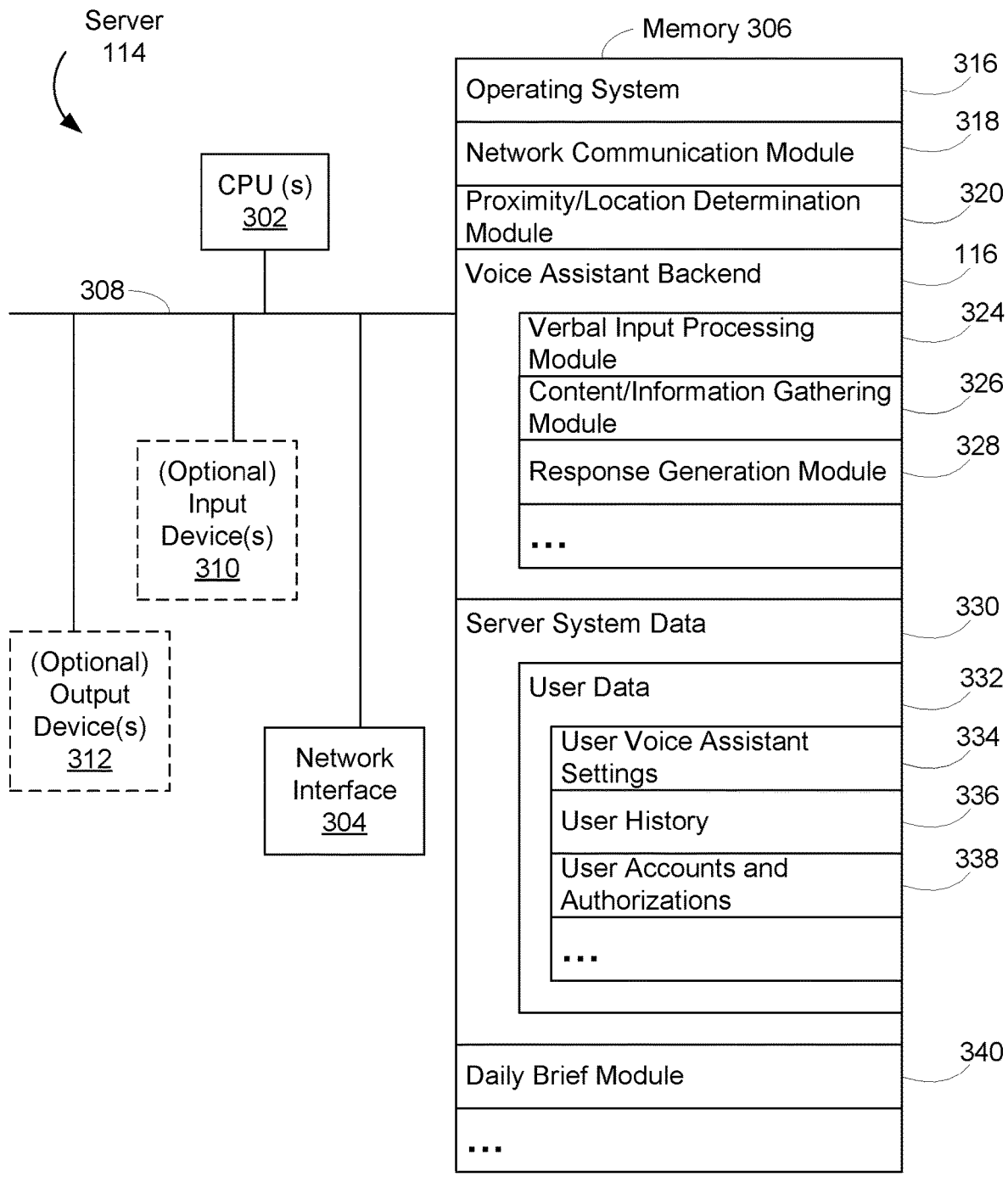
FIG. 3 is an example server system in accordance with some implementations.

FIG. 3 is a block diagram illustrating an example server system 114 of a network environment 100 in accordance with some implementations. The server 114, typically, includes one or more processing units (CPUs) 302, one or more network interfaces 304, memory 306, and one or more communication buses 308 for interconnecting these components (sometimes called a chipset). The server 114 optionally includes one or more input devices 310 that facilitate user input, such as a keyboard, a mouse, a voice-command input unit or microphone, a touch screen display, a touch-sensitive input pad, a gesture capturing camera, or other input buttons or controls. Furthermore, the server 114 may use a microphone and voice recognition or a camera and gesture recognition to supplement or replace the keyboard. In some implementations, the server 114 optionally includes one or more cameras, scanners, or photo sensor units for capturing images, for example, of graphic series codes printed on the electronic devices. The server 114 optionally also includes one or more output devices 312 that enable presentation of user interfaces and display content, including one or more speakers and/or one or more visual displays.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the server system 114 to other devices (e.g., the client devices 102 and/or 104) via one or more network interfaces 304 (wired or wireless) and one or more networks 112, such as the Internet, other wide area networks, local area networks, metropolitan area networks, and so on;
- Proximity/location determination module 320 for determining the proximity and/or location of the client device 102 based on location information of the client device 102 and/or 104;
- Voice assistant backend 116 for processing voice assistant verbal inputs from client devices 102, including one or more of:
  - Verbal input processing module 324 to process verbal inputs to identify commands and requests in the verbal inputs;
  - Content/information gathering module 326 to gather content and information response to the commands and requests; and
  - Response generation module 328 to generate verbal outputs responsive to the commands and requests (e.g., audio briefings) and to populate the verbal outputs with responsive content and information; and Server system data 330 storing at least data associated with operation of a voice assistant platform, including:

User data 332 for storing information associated with users of the voice assistant, including:

User voice assistant settings 334 for storing voice assistant settings information corresponding to voice assistant settings 228, including content/information sources 230 and categories 232;

User history 336 for storing user's histories with the voice assistant, including histories of commands and requests and corresponding responses; and User accounts and authorizations 338 for storing users' authorizations to access the users' respective accounts at content/information sources 230 and account information for those authorized accounts, corresponding to user accounts and authorizations 236.

In some implementations, the server 114 also includes, in memory 306, a daily brief module 340 for generating audio briefings, including determining what content and information is to be included and the order of inclusion in an audio briefing. In some implementations, the daily brief module 328 is a part of the voice assistant backend 116.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, the audio briefing engages the user for a relatively short amount of time (e.g., a few minutes) by presenting information that is tailored to the user, useful, entertaining, and relevant to the day. The information in the audio briefing may include audio doodles, upcoming birthdays (e.g., of the user's contacts), flight status, messages (e.g., emails, text messages), weather, traffic conditions, calendar, reminders, financial information (e.g., stocks information for the day), sports information, horoscopes, news, music, and tips and features updates for the audio briefing or voice-based assistant features.

In some implementations, the audio briefing changes depending on the time of day. For example, the salutation may differ by time of day, or certain information is included or not included by the time of day (e.g., commute traffic is included in a briefing in the morning but not at night). As another example, a briefing may be held off until the next morning if the request for the briefing was made late at night.

In some implementations, the audio briefing is configurable, in that the user may define and specify which categories of information, and specific parameters within the categories is to be included in briefings to the user. For example, the user may specify a plurality of cities and/or zip codes for weather information, a plurality of stocks or stock indexes for finance information, a plurality of sports teams for sports information, and a plurality of news providers for news. In some implementations, default parameters are available for each category, and any user specifications are stored in user data 332.

In some implementations, audio briefings have multiple elements that may vary from briefing to briefing. For example, audio briefings to a particular user may vary, from briefing to briefing, in pronunciation, the voices used, sound effects, accompanying music, transition words between categories, timing of pauses, and salutation. In some implementations, the audio briefings include the user's name and address the user by name. In some implementations, audio briefings may start and/or end with earcons that are different from earcons for other spoken responses from the voice assistant.

In some implementations, the audio briefing tells users useful and entertaining information that is relevant to the day. The information presented is tailored to the individual user. In this manner, the audio briefing is unique and relevant to each user.

The user may request the audio briefing by uttering "daily brief" to a client device 102 with active voice assistant functionality. A user can hear about weather, traffic, calendar events, reminders, news, etc., which are tailored to the user. A user can configure which categories of information the audio briefing presents (e.g., by changing sources 230 and categories 232). In some implementations, the information that is presented for each category may vary, depending on the time of day.

In some implementations, targeted information may be automatically included in the audio briefing without requiring any user configuration. For example, if a user listens to a particular singer once per day, the audio briefing will automatically inform the user when the singer is coming to town and allows the user to purchase tickets.

In some implementations, the audio briefing includes an earcon that signifies the start and/or the end of the audio briefing.

In some implementations, the client device 102 may display a user interface that acknowledges the audio briefing is in progress, but not the actual information included in the audio briefing. In some implementations, the user interface includes an affordance that allows the user to stop the audio briefing.

In some implementations, certain verbal inputs are interpreted as a request for an audio briefing. These verbal inputs may be predefined as specific phrases or phrases that for certain things or has certain keywords.

In some implementations, if the client device 102 is a wearable device, the audio briefing may be triggered by the user putting on the wearable device for the first time in the morning.

In some implementations, the user may stop an audio briefing in progress by uttering a predefined command or activating a predefined affordance in a user interface.

In some implementations, information of multiple categories may be included in an audio briefing. The user may configure at least some of the categories. In some implementations, one or more of the categories are always included in the audio briefing. For example, the audio briefing may always include a salutation, the current time, and the user's birthday (e.g., wish the user a happy birthday).

In some implementations, the audio briefing includes an audio doodle (e.g., a fact or quote of the day and/or relevant to the day). The user may configure whether to include audio doodles in audio briefings.

In some implementations, the audio briefing includes information on birthdays of the user's contacts. The user may configure whether to include contacts' birthdays in audio briefings, as well as managing linkage to contacts information from which the contacts' birthdays are retrieved.

In some implementations, the audio briefing includes information on the user's flight status, as well as flight reminders to the user. The user may configure whether to include flight status information in audio briefings. Flight information from a user may be retrieved from a user's emails, which may include the confirmations of flight bookings by the user, with the user's authorization. The user's flights may be cross-referenced with publicly accessible flight status information.

In some implementations, the audio briefing includes the user's unread messages (e.g., emails, instant messages, text messages, etc.). The user may configure whether to have unread messages included in audio briefings, and also which types of messages to include in the briefing (e.g., the user may want emails but not instant messages included).

In some implementations, the audio briefing may include weather information for one or more locations (in some implementations, up to two locations). The user may configure whether to have weather information in audio briefings, as well as specifying the locations (by city name or postal code) for which weather information is desired. The weather information included in the audio briefing may include the current weather and the day's forecast for each specified location. In some implementations, the audio briefing may include weather information for the current location of the device, even if the location is not pre-specified by the user.

In some implementations, the audio briefing may include a status or summary of the user's work commute. The status or summary may be expressed in summary form (e.g., "light," "normal," "heavy," estimated commute time) and/or with specifics (e.g., information on delays in public transit the user takes to work). If the user has a flight, the briefing may include information on traffic to the airport instead of to work. The user may configure whether to include commute/traffic information in audio briefings, as well as specifying a work address as the target destination and a preferred mode of transportation.

In some implementations, the audio briefing may include the user's calendar events (e.g., the user's next appointment, attendees to the appointment). The user may configure whether to include calendar events in the audio briefings, as well as specifying the calendar(s) from which events are retrieved for inclusion in audio briefings.

In some implementations, the audio briefing may include reminders (e.g., tasks) set for the day. The user may configure whether to include reminders in audio briefings.

In some implementations, the audio briefing may include financial information (e.g., latest quotes for stocks, exchanges, and stock indexes). The user may configure whether to include financial information in audio briefings, as well as specifying the stocks (by company name or ticker symbol), stock indexes, and exchanges for which information is to be included in audio briefings.

In some implementations, the audio briefing may include sports information (e.g., sports scores). The user may configure whether to include sports information in audio briefings, as well as specifying the sports, leagues competitions, and/or teams for which sports information is to be included in audio briefings.

In some implementations, the audio briefing may include tips and feature updates regarding the voice assistant. The user may configure whether to include these tips and updates in audio briefings. In some implementations, these tip and updates may be included in audio briefings at most once per week (e.g., a weekly roundup of feature updates, a weekly voice assistant usage tip). In some implementations, the voice assistant may postpone including tips and feature updates in audio briefings to a particular user until the user has heard the briefings or used the voice assistant multiple times.

In some implementations, the audio briefing may include news and/or music. In some implementations, either news or music, but not both, is included in audio briefings. The user may configure whether to include news and/or music in audio briefings, as well as specifying sources and categories of news and/or music to be included in audio briefings.

In some implementations, a default configuration for what is included in an audio briefing includes the following: an earcon to start the audio briefing, a salutation or greeting (e.g., "good morning" or the like), the current time, an audio doodle, flight status (if the user has a flight for the day), unread messages, weather, work commute, calendar, reminders, voice assistant tips and feature updates, and news.

In some implementations, the content and information included in audio briefings vary based on time of day. For example, work commute information may be omitted from a night audio briefing, when work commute information is less relevant.

In some implementations, the content and information included in audio briefings vary based on device capability. For example, unread messages may be included in an audio briefing transmitted to a device capable of interaction with the messages, but omitted from an audio briefing transmitted to a device not capable of interaction with the messages.

In some implementations, an audio briefing is generated by the server 114 in real-time and presented in real-time (e.g., streamed to the client device 102 as the server 114 generates later parts of the audio briefing).

Figure 4:
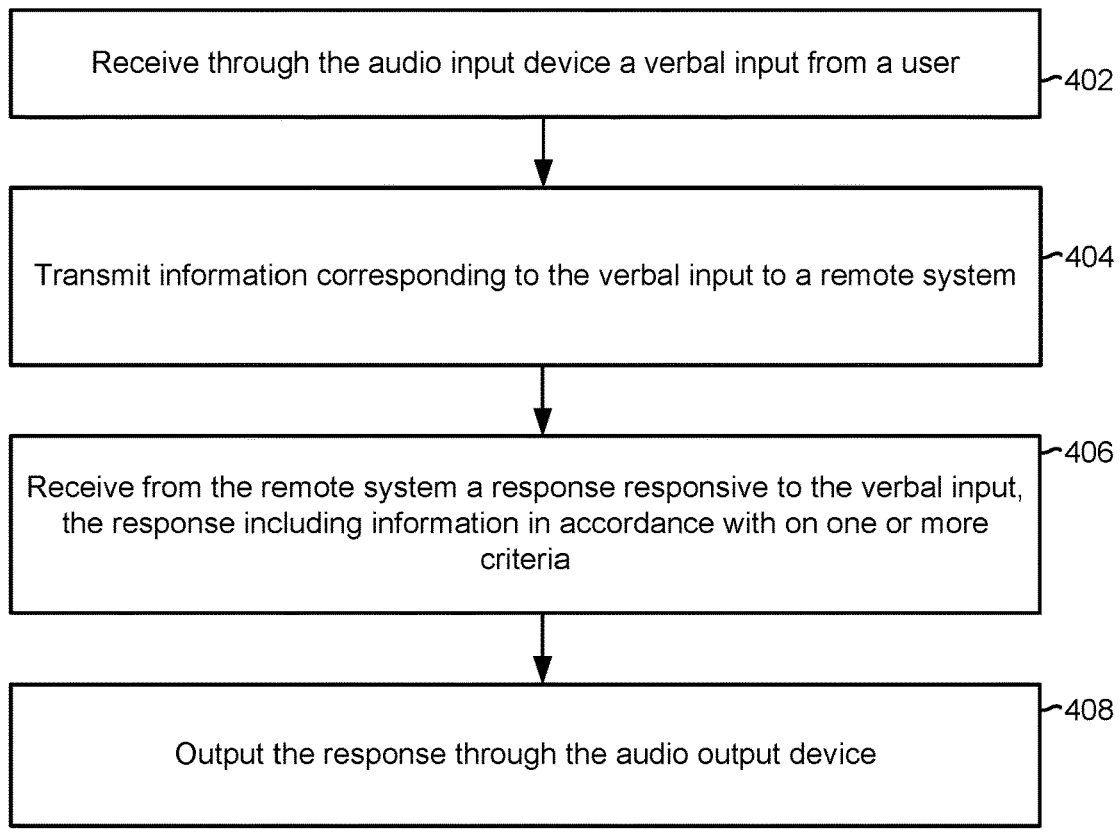
FIG. 4 is a flow diagram of a method for presenting audio briefings in accordance with some implementations.

FIG. 4 illustrates a flow diagram of a method 400 for presenting audio briefings in accordance with some implementations. Method 400 may be performed by an electronic device (e.g., client device 102) with an audio input device (e.g., audio input device 108) and an audio output device (e.g., audio output device 110). In some implementations, an electronic device includes an audio input device (e.g., audio input device 108), an audio output device (e.g., audio output device 110), one or more processors (e.g., processing unit(s) 202), and memory (e.g., memory 206) storing one or more programs to be executed by the one or more processors, the one or more programs including instructions for performing the method 400. In some implementations, a non-transitory computer readable storage medium stores one or more programs, the one or more programs including instructions, which, when executed by an electronic device with an audio input device (e.g., audio input device 108), an audio output device (e.g., audio output device 110), and one or more processors (e.g., processing unit(s) 202), cause the electronic device to perform the method 400.

The device receives (402) through the audio input device a verbal input from a user. The client device 102 captures a verbal input from the user via the audio input device 108 (e.g., a microphone). The verbal input may be an input to trigger an audio briefing (e.g., "daily brief," "what does my day look like?").

The device transmits (404) information corresponding to the verbal input to a remote system. The client device 102 (e.g., the voice assistant module 106) may perform preprocessing on the verbal input to extract or determine information from the verbal input. The client device 102 transmits the information obtained from the preprocessing and/or the verbal input itself (e.g., as audio data) to the server 114. The transmission may also include other information useful to the server 114 for processing the verbal input (e.g., location of the client device 102, type of client device 102).

The device receives (406) receives from the remote system a response responsive to the verbal input, the response including information in accordance with one or more criteria. The server 114, after receiving the information obtained from the preprocessing and/or the verbal input itself, processes the verbal input and generates a response. If the server 114 determines that the verbal input is an input to trigger an audio briefing, the daily brief module 340 generates an audio briefing based on one or more criteria. The audio briefing is transmitted to, and is received by, the client device 102.

The device outputs (408) the response through the audio output device. The client device 102 outputs the audio briefing through an audio output device 110 (e.g., speaker(s)).

In some implementations, the one or more criteria comprise a time of day. The content and information that the server 114 may include in the audio briefing may vary based on time of day. For example, work commute traffic information may be omitted from an audio briefing generated during nighttime in the user's area.

In some implementations, the one or more criteria comprise a type of the electronic device. The content and information that the server 114 may include in the audio briefing may vary based on the device type of the client device 102. Some types of devices allow interaction with messages, and some do not. Unread messages may be included in audio briefings generated for a device that allows interaction with messages, and omitted from audio briefings generated for a device that does not allow interaction with messages.

In some implementations, the one or more criteria comprise a location of the electronic device. The content and information that the server 114 may include in the audio briefing may vary based on the device location of the client device 102. For example, if the client device 102 is already at the user's workplace, work commute information may be omitted. As another example, weather information for the current location of the client device 102 may be included in audio briefings even if the user did not pre-specify the location as a location for which weather information is desired.

In some implementations, the one or more criteria comprise a usage history of the electronic device by the user. For example, tips and feature updates regarding the voice assistant may be omitted from audio briefings until the user had heard audio briefings or used the voice assistant multiple times.

In some implementations, the information includes information sourced from one or more sources specified by the user. For example, the user may specify sources of news and music from which news and/or music may be obtained by the server 114 for inclusion in an audio briefing. As another example, the user may specify calendars from which events are obtained by the server 114 for inclusion in an audio briefing.

In some implementations, the information includes information associated with one or more categories specified by the user. The user may specify for inclusion in or exclusion from audio briefings categories of information (e.g., sports information, financial information, calendar events, reminders, unread messages, contacts' birthdays, etc.)

In some implementations, the response is generated by the remote system in real-time or near real-time. In some implementations, the response is streamed from the remote system to the electronic device in real-time or near real-time, and receiving from the remote system a response responsive to the verbal input comprises receiving the streamed response and outputting the streamed response in real-time or near real-time. The server 114 may generate the audio briefing in real-time or near real-time and stream the audio briefing to the client device 102 (e.g., continuously generate and stream until completion). The client device 102 receives and outputs (e.g., plays) the audio briefing stream as the briefing is streamed from the server 114.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of providing an audio briefing to a user, comprising:
at an electronic device comprising memory and one or more processors:
receiving, from the user, identification of one or more information sources associated with the user, wherein each of the information sources is associated with a content type;
receiving, from the user, an authorization to access the one or more identified information sources;
receiving, from the user, a preferred order of content types for presentation within the audio briefing;
transmitting, to a remote system, the identification of one or more information sources, the authorization, and the preferred order;
following the transmitting, receiving a verbal input from the user requesting the audio briefing; and
in response to the verbal input:
receiving a response generated by the remote system, the response including content from the one or more information sources and information inserted by the remote system based on the authorization to access received from the user, wherein an order of the content and the information within the response is modified based on a device type of the electronic device and one or more criteria associated with the user as compared to the preferred order of the content types at least in part by omitting at least one content type from the preferred order or by adding at least one content type to the preferred order based at least in part on the device type of the electronic device; and
outputting, according to the preferred order, an audible response.

2. The method of claim 1, wherein the audio briefing includes public information and personal information associated with the user.

3. The method of claim 2, wherein the authorization to access the one or more information sources includes authorization to access the personal information associated with the user.

4. The method of claim 1, wherein the response is streamed from the remote system to the electronic device in real-time.

5. The method of claim 1, wherein the information inserted by the remote system is based on one or more real-time criteria associated with the user.

6. The method of claim 5, wherein the one or more real-time criteria comprise at least one of:
a time of day;
a location of the electronic device; and
a usage history of the electronic device by the user.

7. The method of claim 5, further comprising modifying the preferred order in accordance with the one or more real-time criteria.

8. The method of claim 7, wherein the modifying the preferred order in accordance with the one or more real-time criteria comprises omitting one or more of the content types for presentation based on a time of day.

9. The method of claim 1, wherein:
the electronic device includes one or more visual indicators; and
the outputting the audible response comprises displaying a status of the electronic device using the one or more visual indicators.

10. An electronic device comprising:
one or more processors; and
memory storing one or more programs to be executed by the one or more processors, the one or more programs comprising instructions for:
receiving, from a user, identification of one or more information sources associated with the user, wherein each of the information sources is associated with a content type;
receiving, from the user, an authorization to access the one or more identified information sources;
receiving, from the user, a preferred order of content types for presentation within an audio briefing;
transmitting, to a remote system, the identification of one or more information sources, the authorization, and the preferred order;
following the transmitting, receiving a verbal input from the user requesting the audio briefing; and
in response to the verbal input:
receiving a response generated by the remote system, the response including content from the one or more information sources and information inserted by the remote system based on the authorization to access received from the user, wherein an order of the content and the information within the response is modified based on a device type of the electronic device and one or more criteria associated with the user as compared to the preferred order of the content types at least in part by omitting at least one content type from the preferred order or by adding at least one content type to the preferred order based at least in part on the device type of the electronic device; and
outputting according to the preferred order an audible response.

11. The electronic device of claim 10, wherein:
the electronic device is communicatively connected to a client device of the user, the client device distinct from the electronic device; and
the instructions for receiving from the user the preferred order of the content types comprise instructions for receiving the preferred order from the client device.

12. The electronic device of claim 10, wherein the audio briefing includes a default salutation, and the instructions for outputting the audible response comprise instructions for outputting the default salutation with the audible response.

13. The electronic device of claim 12, the one or more programs further comprising instructions for:
outputting with the audible response a modified salutation that is distinct from the default salutation, depending on a time of day.

14. The electronic device of claim 10, wherein:
the electronic device includes one or more visual indicators; and
the instructions for the outputting the audible response comprise instructions for displaying a status of the electronic device using the one or more visual indicators.

15. The electronic device of claim 10, the one or more programs further comprising instructions for:

while outputting the audible response, receiving a predefined command from the user; and
responsive to the predefined command, terminating the outputting.

16. A non-transitory, computer-readable storage medium storing one or more programs, the one or more programs comprising instructions that, when executed by an electronic device having one or more processors, cause the electronic device to:
receive, from a user, identification of one or more information sources associated with the user, wherein each of the information sources is associated with a content type;
receive, from the user, an authorization to access the one or more identified information sources;
receive, from the user, a preferred order of content types for presentation within an audio briefing;
transmit, to a remote system, the identification of one or more information sources, the authorization, and the preferred order;
following the transmitting, receive a verbal input from the user requesting the audio briefing;
in response to the verbal input:
receive a response generated by the remote system, the response including content from the one or more information sources and information inserted by the remote system based on the authorization to access given by the user, wherein an order of the content and the information within the response is modified based on a device type of the electronic device and one or more criteria associated with the user as compared to the preferred order of the content types at least in part by omitting at least one content type from the preferred order or by adding at least one content type to the preferred order based at least in part on the device type of the electronic device; and
output according to the preferred order an audible response.

17. The non-transitory, computer-readable storage medium of claim 16, wherein the audio briefing includes public information and personal information associated with the user.

18. The non-transitory, computer-readable storage medium of claim 17, wherein the authorization to access the one or more information sources includes authorization to access the personal information associated with the user.

19. The non-transitory, computer-readable storage medium of claim 16, wherein the content from the one or more information sources includes content associated with one or more categories specified by the user.

20. The non-transitory, computer-readable storage medium of claim 16, wherein the response is generated by the remote system in real-time.

* * * * *